Figure 1:
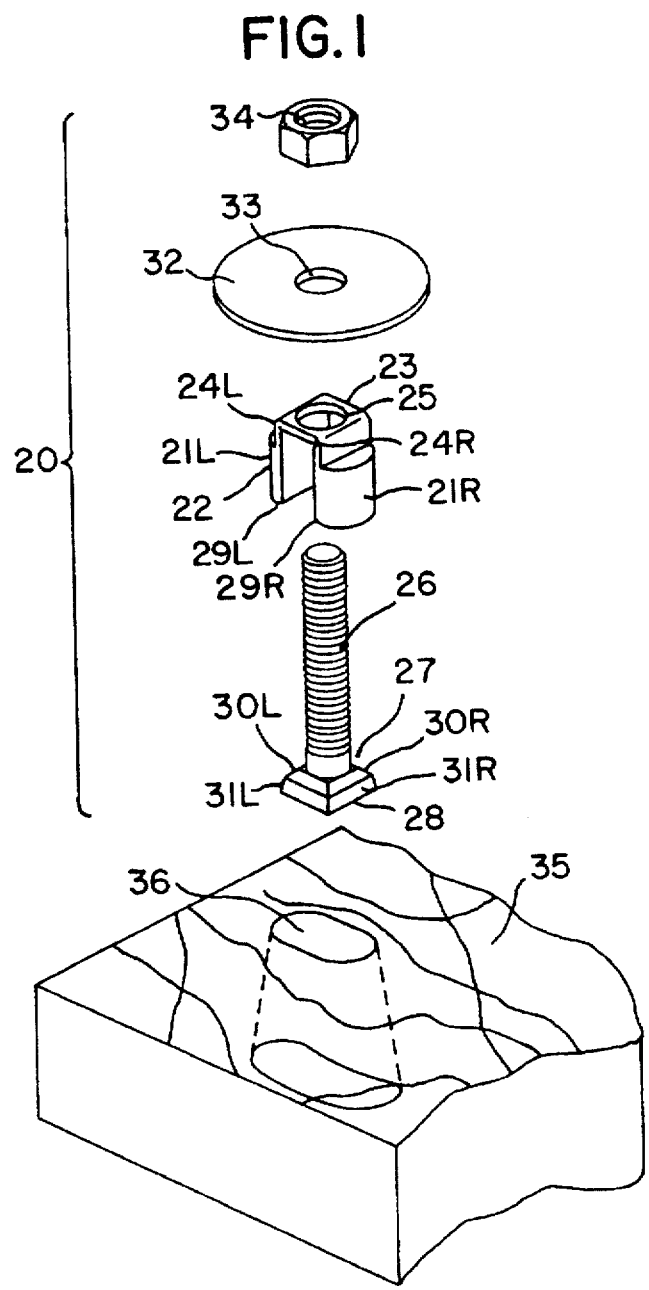

United States Patent [19]
Mitchell

[11] Patent Number: 5,727,355
[45] Date of Patent: Mar. 17, 1998

[54] STONE FACING SECTION ANCHOR MOUNTING SYSTEM

[76] Inventor: Richard A. Mitchell, 1437 Greencove, Garland, Tex. 75040

[21] Appl. No.: 489,428

[22] Filed: Jun. 12, 1995

[51] Int. Cl.⁶ ............................... E04B 1/38; F16B 13/00
[52] U.S. Cl. .................................. 52/698; 411/44; 411/63
[58] Field of Search ........................... 411/44, 57, 63; 52/698, 704, 707, 708, 711, 153, 154

[56] References Cited

U.S. PATENT DOCUMENTS

| | | | |
|---|---|---|---|
| 1,076,175 | 10/1913 | Van Antwerp | 411/57 |
| 1,244,992 | 10/1917 | Lee | 52/698 X |
| 1,302,609 | 5/1919 | Waage | 411/44 |
| 1,469,668 | 10/1923 | Karitzky | 411/57 |
| 2,052,793 | 9/1936 | Peirce | 411/57 |
| 4,898,505 | 2/1990 | Froehlich | 411/57 X |

FOREIGN PATENT DOCUMENTS

| | | | |
|---|---|---|---|
| 0099068 | 4/1940 | Sweden | 52/704 |

*Primary Examiner*—Robert Canfield
*Attorney, Agent, or Firm*—Thomas A. Marcoux

[57] ABSTRACT

A stone facing section anchor mounting system has a special hole configuration, in facing stone, that will not rotate while being installed, and because of its installed angularity and pressure points will not tend to rupture or pull out of the stone. The anchor system holds beyond the lateral strength of the stone itself when the stone is at the cracking point. The superior holding power of the present anchor and its minimum edge distance eliminates the kerf and aluminum "J" structure and silicone used with other anchors, and while having the advantage of being hidden it also has the holding power of a through bolt. Fan nut anchor holes in facing material are made with ease to tolerances required. The anchors do not rotate during installation and use a lock nut that does not work loose in transit and the anchor is such, with accurate hole predetermined angularity that installation can be made without over tightening occurring.

10 Claims, 3 Drawing Sheets

STONE FACING SECTION ANCHOR MOUNTING SYSTEM

BACKGROUND OF THE INVENTION

This invention relates in general to the mounting of facings of materials on a building, and more particularly, to the fastening of thin sheet sections of stone to metal trusses of a building with concealed anchors.

Many aluminum framed all glass sheathed buildings have been subject to high criticism for appearing like a row of glass boxes of varying sizes. In attempts to counter this architects have added different geometric shapes including curved walls and arches but, this did not satisfy the critics. A further step involved the idea of stone and glass buildings that did not employ the slow and tedious job of putting giant blocks of stone in place with a crane or bricks and blocks laid up piece by piece. Instead architects have designed metal trusses in the outline shape of the building wherein thin pieces of stone are fastened to the trusses, stones in sheet form with a maximum size of approximately five feet by five feet, and a minimum thickness of one inch. Concealed anchors are important in this system with bent bolt anchors being a popular anchor but not without problems. Bent bolts are each, a threaded rod having a bent end at approximately twenty two and one half degrees that extends into a hole drilled into the back of the stone at twenty two and one half degrees from a normal axis centered in the rearward extension of the rod when the bent end is in place in the hole. The epoxy is put into the hole first and then the bent bolt bent end is inserted with the protruding part perpendicular to the back of the stone. The epoxy is used to hold the anchor in the correct position with the bent end in hole in the stone. Among the problems with bent bolt anchors is a tendency to rotate out of the hole, and pull out by rupturing the back of the stone at a low force pull. In addition, with bent bolts, big edge distances, distance from the edge of the stone are required, and the stone must have a kerf in the bottom and the top edge with silicone being used in the kerfs before installing an aluminum extruded "J" to secure the stone edges. Other anchors for fastening stone available on the market include some that require great accuracy in drilling the anchor holes, others when being tightened during installation have the problem of turning in the hole. Most of these preexisting anchors, when loaded to their maximum, will rupture the stone, or as known in the trade, fail at a low yield with most anchors installed at the stone fabrication plant.

It is therefore a principal object of the present invention to, through the use of special stone anchors, have more securely mounted thin stone material slabs in place on a building.

Another object is to make mounted retention of stone facing slabs more secure and safer.

Still another object is to make the installation of thin stone building facing slabs quicker and more efficiently.

A further object with such stone mounting anchors is for them to be ensiled by the stone sheeting they mount.

Features of the invention useful in accomplishing this above objects include, in a stone facing section anchor mounting system, a facing stone mounting anchor that by design and special hole configuration will not rotate while being installed. It is an anchor that because of its installed angularity and pressure points, it will not tend to rupture or pull out of the stone and that holds beyond the lateral strength of the stone itself when it is at the cracking point. The present anchor with its superior holding power and minimum edge distance eliminates the kerf and aluminum "J" structure and silicone used with other anchors, and while having the advantage of being hidden it also has the holding power of a through bolt. Anchor holes in building facing stone can be made with ease to tolerances required, and the anchors can be job site installed to minimize package protection problems in shipping, and if factory installed and damaged in transit, it can be easily taken out and replaced in the field. These anchors, that do not rotate can be installed with a lock nut that does not work loose in transit. The anchor structure is such, with accurate hole predetermined angularity, that installation can be made without over tightening occurring. This is important since over tightening takes away from wind load support abilities.

Specific embodiments representing what are presently regarded as the best modes of carrying out the invention are illustrated in the accompanying drawings.

Figure 2:
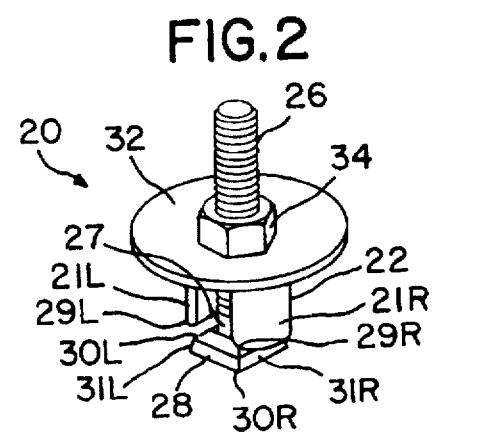
Figure 5:
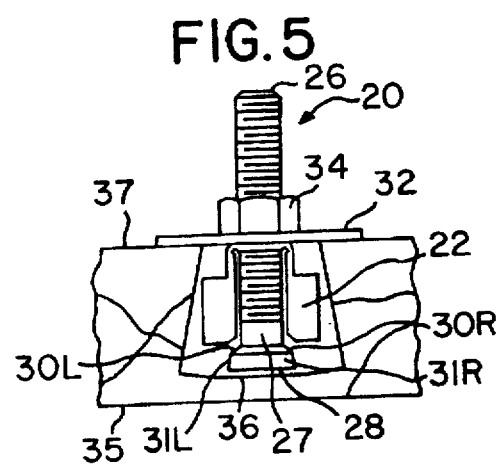
Figure 3:
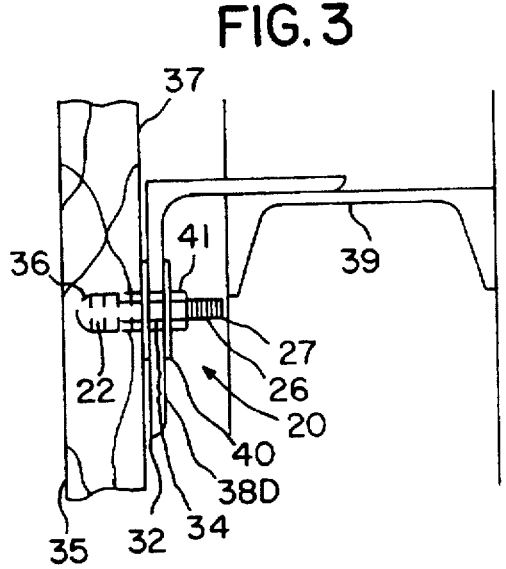
Figure 4:
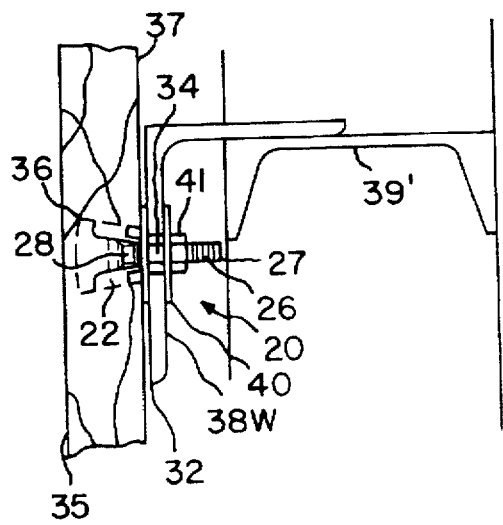

Referring to the drawings:

FIG. 1 represents an exploded perspective view of the new two lobed anchor and a facing stone with a routed hole into which the anchor is positioned;

FIG. 2 a perspective view of an assembled two lobed anchor ready to be placed in the stone anchor hole;

FIG. 3 a side elevation view of the anchor in a facing stone opening in a dead load horizontal state;

FIG. 4 another side elevation view with the anchor and hole in the ninety degree vertical wind load state from the dead load state of FIG. 3;

FIG. 5 a side view, of a non-expanded two lobed anchor as initially inserted into an anchor hole in a stone.

Figure 6:
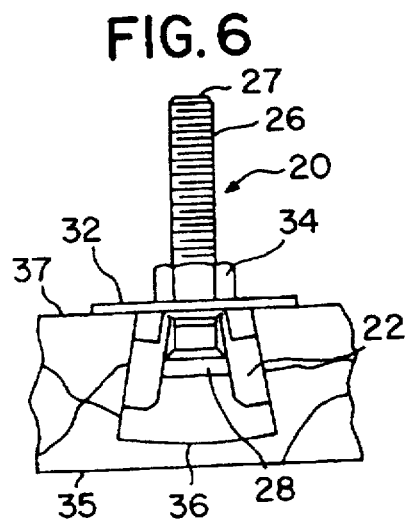
Figure 7:
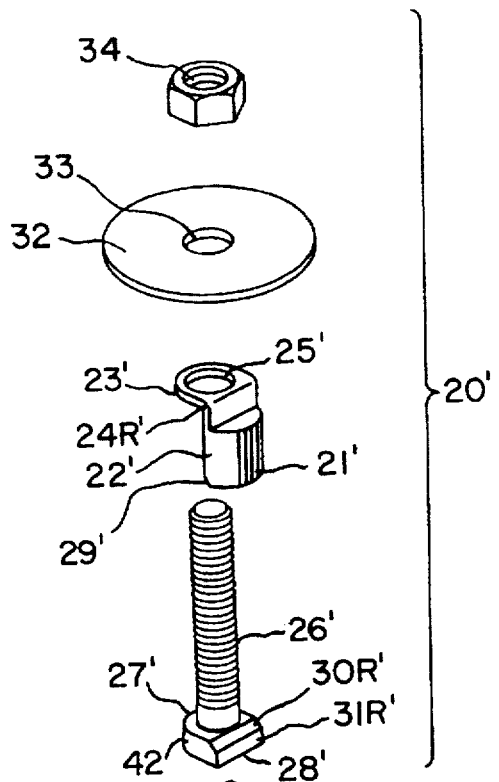
Figure 8:
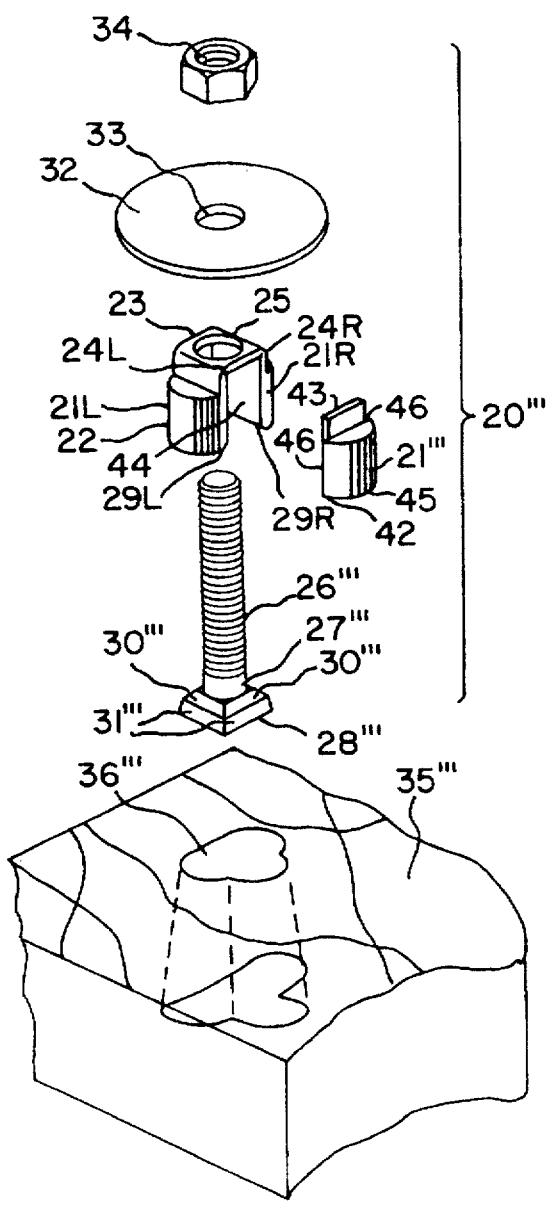
Figure 9:
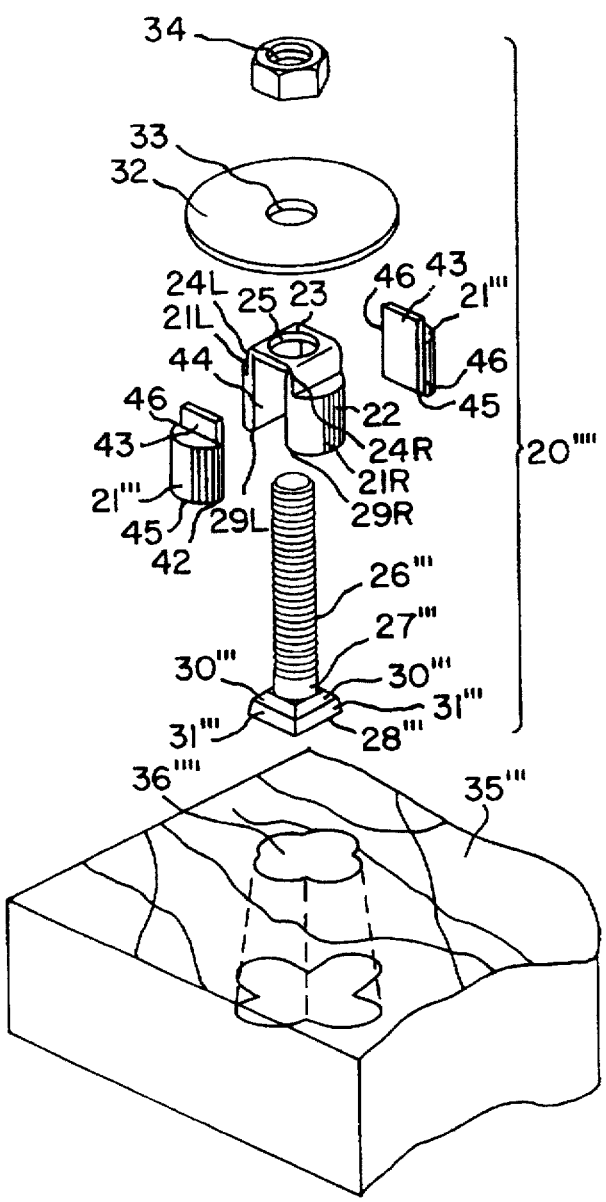

FIG. 6 a side view of the two lobed anchor as expanded in place in the stone anchor hole;

FIG. 7 an exploded perspective view of the single lobe embodiment of the new anchor and the facing stone hole receiving the anchor;

FIG. 8 an exploded perspective view of the three lobe embodiment of the new anchor and the facing stone hole receiving the anchor; and, FIG. 9 an exploded perspective view of the four lobe embodiment of the new anchor and the facing stone hole receiving the anchor.

The anchor 20 of FIGS. 1–6 is a two lobed 21R and 21L anchor with lobes 21R and 21L opposite sides of a saddle member 22 having a top bridge 23 with opposite inner side edges having one thirty second deep "V" grooves 24R and 24L. A round hole 25 is centered in top bridge section 23 that the threaded section 26 of bolt 27 extends through from bolt head 28. Each lobe 21R and 21L has a bottom inner side beveled surface 29 (L and R) which upon installation come into contact first with opposite side slopes 30 (L and R) on the bolt head 28 and then bolt head slopes 31 (L and R) tapered approximately ten degrees from the longitudinal axis of bolt 27. A washer 32 has a center opening 33 that permits through passage of the bolt threaded section 26 and nut 34 therefore.

Material such as a building facing stone 35 (or concrete, wood, plastic or some other material) is provided with fan holes 36 special shaped holes wider at the bottom in at least one direction, routed into the material (stone 35) to be attached.

The hex nut 34 is turned on bolt 27 until it is finger tight against washer 32, as shown in FIG. 2, after which the anchor is inserted into a fan hole 36 with washer 32 against the inner side surface 37. The hex nut 34 is then turned six full revolutions while holding the washer 32 snug against inner side surface 37 to bring the anchor 20 to the state of FIG. 6 with the bolt head 28 drawn up and the opposite lobes 21L and 21R expanded outwardly within the fan hole 36 through the interaction of beveled surfaces 29 (L and R) with bolt head slopes 30 (R and L) and 31 (R and L).

Referring back to the dead load support state of the anchor 20, as shown in FIG. 3, the fan hole 36 and the lobes 21L and 21R are horizontally oriented and in the wind load state of FIG. 4 with the anchor turned ninety degrees to the vertical along with the fan hole 36 in the vertical state. Both of these states are shown to include mounting "L" brackets 38D and 38W, respectively, that are supported by building frame brackets 39 and, 39'. An additional washer 40 and nut 41 are employed in both of these mountings.

A single lobe 21' is used in the FIG. 7 anchor 20' embodiment in place of the two lobed saddle member 22 with the saddle member 22' in this instance having a half round rabbet section 23' that has an opening 25'. The tongue is bent ninety degrees at a one sixteenth bend radius 24R' to the depending lobe 21R' that has a lobe bottom slope 29'. Lobe bottom slope 29' after the lobe bottom engages bolt head 28', slope 30R' it engages bolt head slope 31R' as nut 34 is turned six full revolutions to expand the anchor 20' and lobe 21' within the special fan hole 36' routed out to a greater extent in only one direction in the stone instead of two. With one side of the bolt head tapered approximately ten degrees the opposite side 42 is made half round matching the position of the fan hole 36'.

A three lobe 21L''', 21R''' and 21''' anchor 20''' embodiment is shown in FIG. 8 that is received in three lobe fan hole 36''' that fans out farther for each of the anchor lobes at depth in the material 35''', stone, concrete, wood or plastic. Saddle member 22, washer 32, and hex nut 34 are the same as with the embodiment of FIG. 1 and they work with threaded bolt section 26''' the same as with threaded bolt section 26 in FIG. 1. The bolt head 28''' is, however, square in this instance and on each side of a first slope 30''' of approximately forty five degrees followed by approximately ten degree slope 31''' in order that the lobes 21L and 21R and lobe 21''' expand outwardly in respective lobe sections of the fan hole 36'''. Lobe 21''' is a saddle bar partial round with a guide grove 46 at each edge. The truncated base 43 of lobe 21''' fits between and is guided by the inner sides 44 of lobes 21L and 21R at least before they are angled apart to properly seat in fan hole 36'''. The lobe base 42 is provided with approximately forty five degrees base bottom angle 45 to aid in its being moved out to its fanned out position in the fanned out stone opening 36'''.

With the four lobed anchor 20''' embodiment of FIG. 9 a second lobe 21''' is added and the fanned out hole 36''' is increased to a four anchor lobe receiving hole 36'''. The same operational actions occur in this embodiment as with that of FIG. 8, that of FIG. 7 and with the embodiment of FIG. 1–6.

Whereas this invention is herein illustrated and described with respect to several embodiments thereof, it should be realized that various changes may be made without departing from the essential contributions made by the teachings hereof.

I claim:

1. An anchor assembly which is adapted to fit into a fan out opening routed in a facing material, said opening being wider at the innermost depth than at its opening entrance said anchor assembly comprising:

a. a bolt with a threaded section and a bolt head having slanted surface means on at least one side;

b. saddle means with a top having an opening passing said bolt threaded section;

c. one or more lobe means depending at approximately ninety degrees from the top of said saddle means;

d. a washer and a nut workable on the threaded section of said bolt, said bolt when tightened when said anchor assembly is placed within the opening entrance of the fan out opening routed in said facing material pushing said saddle means and lobe means down and with contact of said lobe means with the said bolt head slanted surface means, the lobe means bends in an outward direction such that it expands to seat within the wider opening at the innermost depth of the fan out opening in said facing material thereby attaching the anchor to the facing material.

2. The anchor assembly of claim 1 wherein said slanted surface means has a first section and a second section with the first section more steeply slanted than the second section.

3. The anchor assembly of claim 2 wherein the lobe means comprise a single lobe with a bottom inner surface slanted at approximately the same slant as the said first section slant of said bolt head.

4. The anchor assembly of claim 1 wherein the lobe means comprise two opposite side lobes depending from the top of said saddle means.

5. The anchor assembly of claim 4 wherein the bolt head has slanted surface means on at least two sides such that when said nut is tightened the bolt head slanted sides contact the two opposite side lobes bending the lobes in an outward direction.

6. The anchor assembly of claim 4 additionally comprising a third lobe which is a steel partial round with a guide groove at each edge and with a truncated longitudinal base extending between the edge guide grooves, said third lobe fits between and is guided by inner sides of the said opposite side lobes depending from the top of said saddle means.

7. The anchor assembly of claim 6 wherein said third lobe has a lobe base with a base bottom angle.

8. The anchor assembly of claim 6 further additionally comprising a fourth lobe which is a steel partial round with a guide groove at each edge and with a truncated longitudinal base extending between the edge guide grooves, said fourth lobe fits between and is guided by inner sides of the said opposite side lobes depending from the top of said saddle means.

9. The anchor assembly of claim 8 wherein said fourth lobe has a lobe base with a base bottom angle.

10. The anchor assembly of claim 1 wherein the bolt threaded section extends outward far enough to pass through a building frame bracket and is secured in place with an additional washer and nut on the outer end of said bolt threaded section after the facing material has been attached to the anchor assembly.

* * * * *